(12) United States Patent
Lu et al.

(10) Patent No.: US 6,847,362 B2
(45) Date of Patent: Jan. 25, 2005

(54) FAST LINE DRAWING METHOD

(75) Inventors: Chung-Yen Lu, Taipei (TW); Jo-Tan Yao, Taipei Hsien (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 350 days.

(21) Appl. No.: 10/191,159

(22) Filed: Jul. 9, 2002

(65) Prior Publication Data

US 2003/0169258 A1 Sep. 11, 2003

(30) Foreign Application Priority Data

Mar. 5, 2002 (TW) .......................... 91104074 A

(51) Int. Cl.[7] .............................................. G06T 11/20
(52) U.S. Cl. ...................................................... 345/443
(58) Field of Search .......................................... 345/443

(56) References Cited

U.S. PATENT DOCUMENTS

| | | | | | |
|---|---|---|---|---|---|
| 4,901,266 | A | * | 2/1990 | Takagi | 708/290 |
| 4,996,653 | A | * | 2/1991 | Butler et al. | 345/443 |
| 5,073,960 | A | * | 12/1991 | Nakai et al. | 382/199 |
| 5,136,689 | A | * | 8/1992 | Walller | 345/443 |
| 5,167,015 | A | * | 11/1992 | Bair et al. | 345/443 |
| 5,280,571 | A | * | 1/1994 | Keith et al. | 345/443 |
| 5,305,432 | A | * | 4/1994 | Kubota | 345/443 |
| 5,309,553 | A | * | 5/1994 | Mukai et al. | 345/443 |
| 5,375,196 | A | * | 12/1994 | Vatti et al. | 345/443 |
| 5,444,825 | A | * | 8/1995 | Bain et al. | 345/443 |
| 5,499,328 | A | * | 3/1996 | Martin | 345/443 |
| 5,570,463 | A | * | 10/1996 | Dao | 345/443 |
| 5,625,769 | A | * | 4/1997 | Takada | 345/443 |
| 5,627,956 | A | * | 5/1997 | Dao et al. | 345/443 |
| 5,627,957 | A | * | 5/1997 | Dao et al. | 345/443 |
| 5,657,435 | A | * | 8/1997 | Watters et al. | 345/441 |
| 5,815,162 | A | * | 9/1998 | Levine | 345/443 |
| 5,898,440 | A | * | 4/1999 | Tachibana | 345/443 |
| 6,215,504 | B1 | * | 4/2001 | Longhenry et al. | 345/443 |
| 6,480,195 | B1 | * | 11/2002 | Chen | 345/443 |

* cited by examiner

*Primary Examiner*—Jeffery Brier
*Assistant Examiner*—Ryan Yang
(74) *Attorney, Agent, or Firm*—Merchant & Gould P.C.

(57) ABSTRACT

A fast line drawing method. First, the coordinates of two end points are received and a current point is assigned to one of the end points. The differences of x and y coordinates ($\Delta x$ and $\Delta y$) and the sum of error E are computed, the integer part of $\Delta x$ over $\Delta y$ is denoted as Q. The current point is checked to determine whether it has reached the end point. If not and the value of E is negative, a point at the current point is drawn. The y-coordinate of the current point and E are updated by (Y+1) and (E−2$\Delta x$) respectively if E is non-negative, a span of pixels from (X,Y) to (X+Q−1,Y) are drawn if the coordinate of last of Q points is less than the end point. Otherwise, a span of pixels from (X,Y) to (x2,Y) are drawn.

2 Claims, 7 Drawing Sheets

```
void Bresenham (int x1,x2,int y1, int y2) {
  int x,y;
  int dx,dy;
  int e;
  x=x1;
  y=y1;
  dx=x2-x1;
  dy=y2-y1;
  e=-dx;
  while (x<=x2) {
    draw(x,y);
    x++;
    e+=2*dy;
    if (e>=0) {
     y++;
     e-=2*dx;
    }
  }
}
```

FIG. 2

| Iteration | Draw | Request |
|---|---|---|
| 1 | (1,1) | |
| 2 | (2,1) | |
| 3 | (3,1) | YES |
| 4 | (4,2) | |
| 5 | (5,2) | |
| 6 | (6,2) | |
| 7 | (7,2) | TES |
| 8 | (8,3) | |
| 9 | (9,3) | |
| 10 | (10,3) | YES |

FIG. 3C

| Iteration | Sum of Error | Test | Draw | Request |
|---|---|---|---|---|
| 0 | -9 | False | (1,1) | |
| 1 | -5 | False | (2,1) | |
| 2 | -1 | False | (3,1) | YES |
| 3 | 3 | True | (4,2)~(7,2) | YES |
| 4 | 1 | True | (8,3)~(10,3) | YES |

FIG. 5

FAST LINE DRAWING METHOD

BACKGROUND OF THE INVENTION

1. Field of the Invention

The present invention relates to a line drawing method, and particularly to a line drawing method that utilizes the nature of memory access to determine and draw multiple points at a time, thereby speeding up line drawing.

2. Description of the Related Art

Modern computer video display devices usually consist of a regular grid of small points of light (pixels), each of which can be independently lit with a color (hue) and an intensity (brightness). One of the most fundamental problems in computer graphics is that of determining which set of pixels best represents an image, and which colors and intensities to assign to those pixels so that straight lines and edges can be drawn on a computer display.

FIGS. 1A, 1B and 1C illustrate the relationship between pixels on screen and memory access. FIG. 1A shows a pixel P with coordinate (x,y) on screen 10 corresponds to location in display buffer. However, a memory operation is able to access data for a plurality of pixels instead of just one. We take a true-color resolution (32 bits for each pixel) display for example. For a memory bus with 128-bit data bus width, a data transfer (block 20) will contain data for four pixels (21, 22, 23 and 24) at one time as illustrated in FIG. 1B. That is, every four pixels are grouped as a block 20 for a memory access unit, as illustrated in FIG. 1C.

The first step in drawing a straight line or edge on a computer display is to determine which pixels on the display most closely approximate the line. A famous algorithm commonly used is Bresenham's algorithm. Before explaining the algorithm, it is necessary to define a few terms. An X-major line lies more horizontally than vertically. The "major axis" of such a line refers to the X-axis, while the "minor axis" refers to the Y-axis. Similarly, a line that lies more vertically than horizontally is a Y-major line. The "major axis" of such a line refers to the Y-axis, while the "minor axis" refers to the X-axis.

FIG. 2 shows an example of an x-major integer Bresenham line-drawing algorithm. In Bresenham's algorithm, lines are drawn using integer math; division is not performed and fractions are not used. Bresenham's algorithm enjoys perfect accuracy and full precision and, hence, draws mathematically perfect lines.

Suppose an x-major line is drawing from P1(1,1) to P2(10,3) in display buffer 11 as illustrated in FIG. 3A. That is, there are three blocks (31, 32 and 33) of pixels for memory access as illustrated in FIG. 3B. FIG. 3C illustrates the line drawing sequence. Ten pixel-drawing operation are needed, namely, ten processing cycles may require for the line drawing. Therefore, even though a memory access can handle the data for four pixels, the performance of line drawing using Bresenham's method is not satisfactory because it determines and draws one point at a time.

SUMMARY OF THE INVENTION

It is therefore an object of the present invention to provide a line drawing method that utilizes the nature of memory access to determine and draw multiple points at a time, thereby speeding up line drawing.

To achieve the above object, the present invention provides a fast line drawing method. According to one embodiment of the invention, the coordinates of two end points are first received as (x1,y1) and (x2,y2). The coordinate (X,Y) of a current point is assigned as (x1,y1), the differences of x and y coordinates of the end points are computed as $\Delta x$ and $\Delta y$, the integer part of $\Delta x$ over $\Delta y$ is denoted as Q, the initial sum of error E is assigned as $-\Delta x$, and two constants K1 and K2 are assigned as $2\Delta y$ and $2*Q*\Delta y$.

The x-coordinate of the current point (X) is checked to determine whether it has reached the x-coordinate of the end point (x2). The line drawing is terminated if the x-coordinate of the current point reaches the x-coordinate of the end point (x2).

If the x-coordinate of the current point (X) has not reached the x-coordinate of the end point (x2), the value of E is tested to determine if it is non-negative. A point at the current point is drawn if E is negative, and the x-coordinate of the current point (X) and E are updated by X+1 and E+K1 respectively. Then, the x-coordinate of the current point (X) is further checked.

The y-coordinate of the current point (Y) and E are updated by (Y+1) and (E$-2\Delta x$) respectively if E is non-negative, the x-coordinate of the last of Q points (X+Q$-1$) is checked to determine whether it is less than the x-coordinate of the end point (x2). A span of pixels from (X,Y) to (X+Q$-1$,Y) are drawn if the x-coordinate of the last of Q points (X+Q$-1$) is less than the x-coordinate of the end point (x2), and a span of pixels from (X,Y) to (x2,Y) are drawn if the x-coordinate of the last of Q points (X+Q$-1$) is not less than the x-coordinate of the end point (x2). After a span of pixels are drawn, the x-coordinate of the current point (X) and E are updated by X+Q and E+K2 respectively, and the x-coordinate of the current point (X) is further checked.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 2 shows an example of an x-major integer Bresenham line-drawing algorithm;

FIG. 3C illustrates the line drawing sequence according to Bresenham line-drawing method;

FIG. 5 illustrates the line drawing sequence of the example in FIG. 3A according to the fast line drawing method of the embodiment.

DETAILED DESCRIPTION OF THE INVENTION

Figure 4:
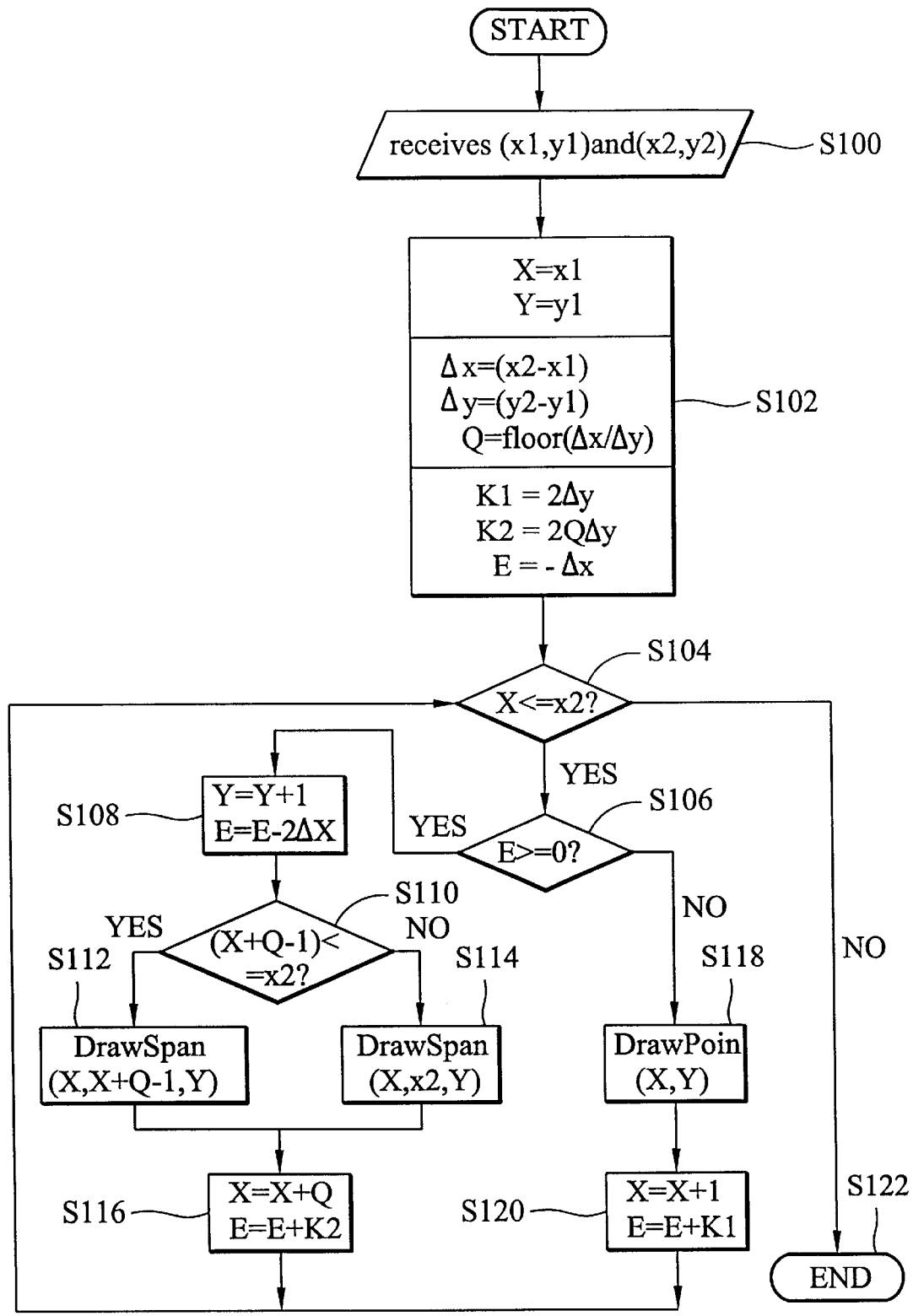
FIG. 4 is a flow chart illustrating the operation of the fast line drawing method according to the embodiment of the present invention.

FIG. 4 is a flow chart illustrating the operation of the fast line drawing method according to the embodiment of the present invention. The present invention utilizes two functions: Draw-Point and Draw-Span. The Draw-Point function records a pixel's position only, and the Draw-Span function records a span of the positions of a set of pixels. Conventional drawing requires several steps: the first is to determine which pixels we want to draw, the second is to record the positions of these pixels, the third is to form memory requests according to the record, and the last step is to issue memory requests for updating pixel data in display buffer. Note that the memory access is not performed in the method of the present invention, as shown in the flowchart of FIG. 4.

First, the coordinates of end points of an x-major line are received as (x1,y1) and (x2,y2) (S100). Then, in step S102, several parameters are initialized. X and Y are assigned x1 and y1 respectively. The coordinate (X,Y) represents the current point, X represents the current x-coordinate and Y represents the current y-coordinate. The differences of x and y are computed and denoted as $\Delta x$ and $\Delta y$. The integer part of $\Delta x$ over $\Delta y$ is represented by Q. If the values of the y axis of two successive drawing points are different, Q is the number of points that can be determined and drawn at a time. The initial sum of error denoted as E is $-\Delta x$, and two constants K1 and K2 are $2\Delta y$ and $2*Q*\Delta y$, respectively.

After E, K1 and K2 are setup, the iteration test for line drawing checks whether the current x-coordinate has reached the end point x-coordinate (S104), that is, whether the line drawing is finished. If the current x-coordinate reaches the end point x-coordinate, the line drawing is terminated (S122).

If the line drawing is continuous (NO in step S104), the value of E is tested if E is non-negative (S106). If E is non-negative (YES in step S106), Y and E are updated by (Y+1) and (E-2$\Delta x$) (S108). Note that the current y-coordinate and the y-coordinate of the pixel to be drawn next will be changed if E is non-negative.

Then, (X+Q-1) is checked to determine whether it is less than x2 (S110). In other words, whether the last of Q points goes beyond the boundary. If the last point doesn't go beyond the boundary, a span of pixels from X to X+Q-1 is determined and drawn (S112). Otherwise, a span of pixels from X to x2 is determined and drawn (S114) if the last point goes beyond the boundary. After a span is drawn, then X and E are updated by X+Q and E+K2 respectively (S116).

When the test E is negative (NO in step S106), only a point is drawn at (X,Y) (S118). Then, X and E are updated by X+1 and E+K1 respectively (S120).

Figure 1A:
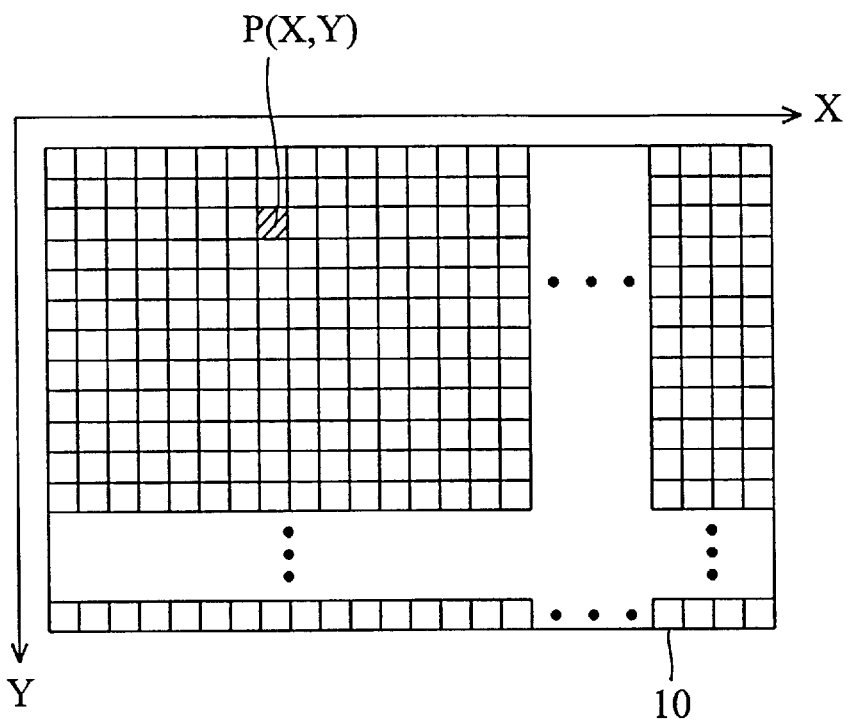
FIG. 1A is a schematic diagram illustrating pixels on screen correspond to locations in display buffer.
Figure 1B:
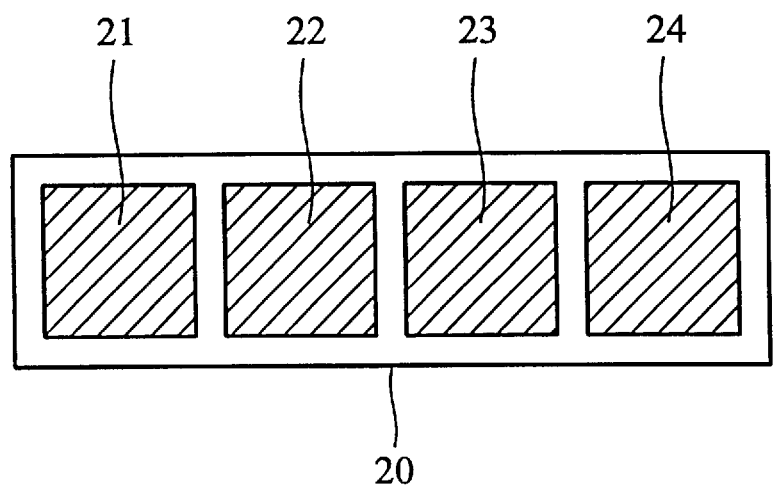
FIG. 1B shows a block with the data for four pixels in one data transfer.
Figure 1C:
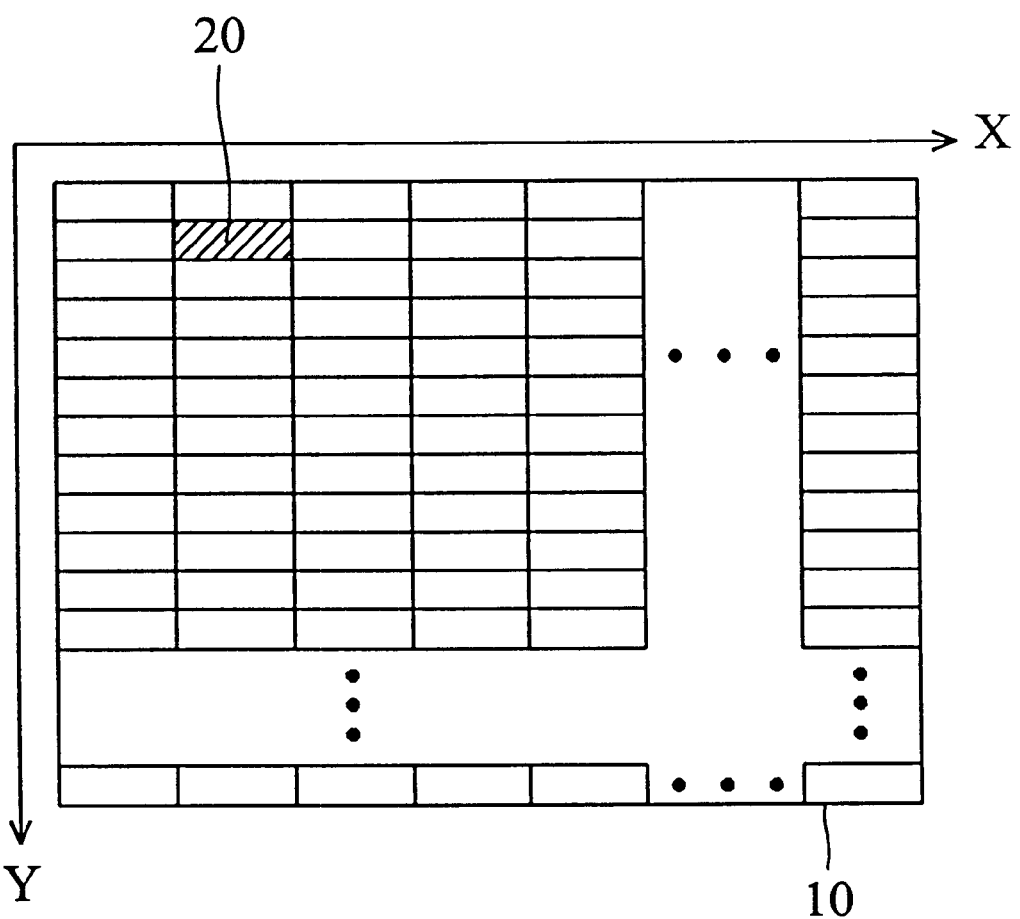
FIG. 1C shows the display buffer with blocks.
Figure 3A:
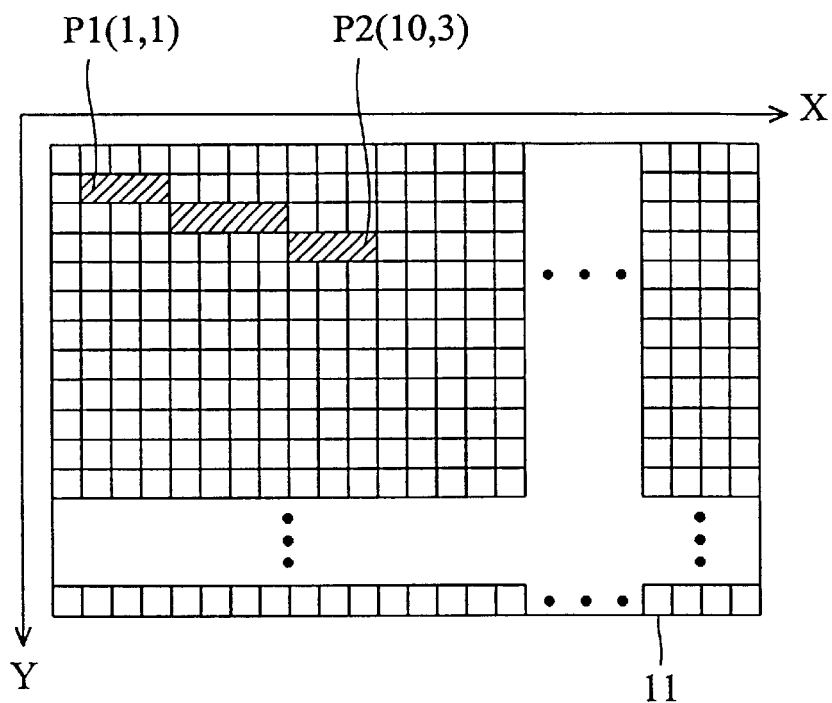
FIG. 3A shows an example of an x-major line drawing from P1(1,1) to P2(10,3) in a display buffer.
Figure 3B:
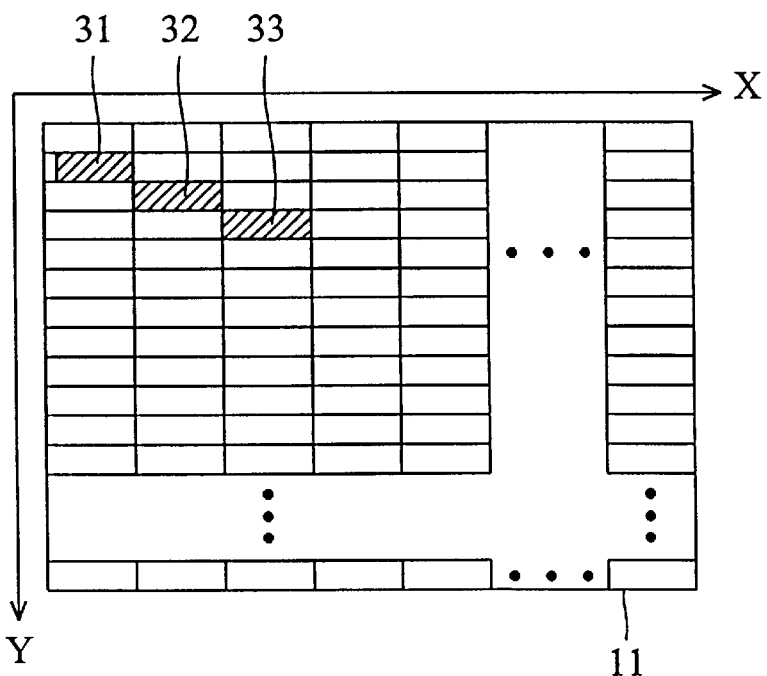
FIG. 3B shows the accessed blocks in the memory accessing.

Next, the example of an x-major line drawing from P1(1,1) to P2(10,3) in FIG. 3A is drawn according to the fast line drawing method of the embodiment. FIG. 5 illustrates the line drawing sequence and the value of related parameters.

For an x-major line drawing, the end points of the line are denoted as P1(1,1) and P2(10,3). Then, the value of $\Delta x$ is 9 and the value of $\Delta y$ is 2. The floor value of $\Delta x$ over $\Delta y$, denoted by Q, equals 4. The constant values K1 and K2 are 4 and 16 respectively. At first, the sum of error, denoted by E, is -9. Because the value of E is negative, a coordinate of the point (1,1) is recorded and E is updated as -5. The value of E is negative again, and the coordinate of the point (2,1) is recorded. Then, the coordinate of point (3,1) is recorded. Because (3,1) is the end of a block comprising (0,1), (1,1), (2,1) and (3,1), a memory request may be issued for updating the pixel color for drawing the points (1,1), (2,1) and (3,1).

Now, E is 3 and it is positive. Thus, Y increases by one. A further test for line end processing is to check whether (X+Q-1) is less than or equal to x2 (10). If the test is successful, then a span is recorded with points (4,2), (5,2), (6,2) and (7,2). It happens that the block pixels' data in display buffer could be updated by a memory request, so a memory request is issued. While E is 1 now, it is still positive so Y increases one again. Because the value of (X+Q-1) is greater than x2, there are only three points indicated by (8,3), (9,3) and (10,3) recorded in a span. Another memory request is issued for it is end of line.

Comparing FIG. 3C and FIG. 5, the improvement of the line drawing performance of the present invention is clear.

It should be noted that the data in memory is recorded row dependent, that is, the data of a plurality of pixels with the same x coordinate is recorded in a memory block. The case of y-major line is similar to x-major line. The difference between x-major line and y-major line is that coordinate x and y are exchanged. However, because of the nature of memory access, the memory request is issued as in the conventional method.

In the present invention, Q pixels can be determined and drawn if the values of y axis (y-coordinate) of two successive drawing points are different in the line drawing. As a result, using the fast line drawing method according to the present invention, memory access property can be utilized to speed up line drawing.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A fast line drawing method, comprising the steps of:
   (a) receiving the coordinates of two end points as (x1,y1) and (x2,y2);
   (b) assigning the coordinate (X,Y) of a current point as (x1,y1), computing the differences of x and y coordinates of the end points as $\Delta x$ and $\Delta y$, assigning Q as the integer part of $\Delta x$ over $\Delta y$, and assigning the initial sum of error E as $-\Delta x$, and two constants K1 and K2 as $2\Delta y$ and $2*Q*\Delta y$;
   (c) checking whether the x-coordinate of the current point (X) has reached the x-coordinate of the end point (x2);
   (d) testing whether the value of E is non-negative;
   (e) drawing a point at the current point if E is negative, updating the x-coordinate of the current point (X) and E by X+1 and E+K1 respectively, and returning to step (c);
   (f) updating the y-coordinate of the current point (Y) and E by (Y+1) and (E-2$\Delta x$) respectively if E is non-negative;
   (g) checking whether the x-coordinate of the last of Q points (X+Q-1) is less than the x-coordinate of the end point (x2);
   (h) drawing a span of pixels from (X,Y) to (X+Q-1,Y) if the x-coordinate of the last of Q points (X+Q-1) is less than the x-coordinate of the end point (x2);
   (i) drawing a span of pixels from (X,Y) to (x2,Y) if the x-coordinate of the last of Q points (X+Q-1) is not less than the x-coordinate of the end point (x2); and
   (j) updating the x-coordinate of the current point (X) and E by X+Q and E+K2 respectively, and returning to step (c).

2. The method as claimed in claim 1 further terminating the line drawing if the x-coordinate of the current point reaches the x-coordinate of the end point (x2).

* * * * *